(12) United States Patent
Humbert et al.

(10) Patent No.: US 10,993,154 B2
(45) Date of Patent: Apr. 27, 2021

(54) OPTIMIZING NEW RADIO STANDALONE AND DUAL CONNECTIVITY ACCESS

(71) Applicant: T-Mobile USA, Inc., Bellevue, WA (US)

(72) Inventors: John J. Humbert, Roeland Park, KS (US); Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/368,267

(22) Filed: Mar. 28, 2019

(65) Prior Publication Data

US 2019/0306763 A1 Oct. 3, 2019

Related U.S. Application Data (60) Provisional application No. 62/651,359, filed on Apr. 2, 2018.

(51) Int. Cl.
| | |
|---|---|
| *H04J 3/00* | (2006.01) |
| *H04W 36/00* | (2009.01) |
| *H04W 76/15* | (2018.01) |
| *H04W 72/12* | (2009.01) |
| *H04W 36/08* | (2009.01) |

(52) U.S. Cl.
CPC ....... *H04W 36/0069* (2018.08); *H04W 36/03* (2018.08); *H04W 36/08* (2013.01); *H04W 72/1242* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2014/0177560 A1 | 6/2014 | Guo | |
| 2015/0215923 A1 | 7/2015 | Jha et al. | |

(Continued)

FOREIGN PATENT DOCUMENTS

| | | |
|---|---|---|
| WO | WO2017127126 | 7/2017 |
| WO | WO2017204539 | 11/2017 |
| WO | WO2018008980 | 1/2018 |

OTHER PUBLICATIONS

PCT Search Report and Written Opinion dated Aug. 6, 2019 for PCT Application No. PCT/US2019/024808, 9 pages.

*Primary Examiner* — Kwang B Yao
*Assistant Examiner* — Juvena W Loo
(74) *Attorney, Agent, or Firm* — Lee & Hayes, P.C.

(57) ABSTRACT

A cell site of a cellular communication network may have both a Long-Term Evolution (LTE) base station and a New Radio (NR) base station to support NR Standalone connectivity and Non-Standalone (NSA) dual connectivity. The NR base station broadcasts system information from which a cellular device can determine relative service qualities of a NR Standalone connection and an NSA connection. The cellular device receives these qualities and compares them to determine whether to initially attach to the LTE base station or to the NR base station. Similarly, during cell reselection, the cellular device receives service quality information from a target LTE base station so that the cellular device can determine whether to attach to the target LTE base station or to an associated NR base station.

20 Claims, 5 Drawing Sheets

(56) References Cited

U.S. PATENT DOCUMENTS

2019/0053115 A1* 2/2019 Ngai ................. H04W 72/0453
2019/0053175 A1* 2/2019 Kubota ................. H04W 16/14
2019/0069229 A1* 2/2019 Lee ....................... H04W 48/16
2019/0223094 A1* 7/2019 Ingale ................... H04W 48/10
2019/0342932 A1* 11/2019 Futaki ................... H04W 76/15
2020/0322894 A1* 10/2020 Xu ....................... H04L 5/0091

* cited by examiner

OPTIMIZING NEW RADIO STANDALONE AND DUAL CONNECTIVITY ACCESS

CROSS-REFERENCE TO RELATED APPLICATION

This application claims priority to the following, commonly owned U.S. Provisional Patent Application No. 62/651,359, filed Apr. 2, 2018, and titled "Method and Procedure for Optimizing NR and EN_DC Access," which is incorporated herein by reference in its entirety.

BACKGROUND

Cellular communication devices such as smartphones use radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for communications with a cellular communication device. Specifically, NSA uses LTE/NR dual connectivity, in which a cellular communication device simultaneously uses both an LTE radio and an NR radio for downlink receptions from and uplink transmissions to corresponding LTE and NR base stations. An LTE bearer is used for control-plane signaling and for user-plane communications. An NR bearer is used for additional user-plane bandwidth as well as for data download or transmission throughput. The LTE base station anchors the communication session in this configuration.

NSA dual connectivity is at times referred to as EN-DC, where EN stands for EUTRAN NR and EUTRAN stands for Evolved Universal Mobile Telecommunications System Terrestrial Radio Network. NSA dual connectivity may also be referred to as MR-DC, where MR stands for Multi Radio Access Technology Dual Connectivity.

It is envisioned that early rollouts of 5G technology will primarily be used for NSA dual connectivity rather than for NR Standalone connectivity. Over time, wireless networks will be upgraded to support 5G NR Standalone communications. However, it is also likely that many systems will retain the ability to operate in NSA configurations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for selecting between collocated or otherwise associated cellular base stations for initial attachment and cell reselection by a cellular communication device. For example, the techniques can be used in situations in which the base stations use different radio access technologies such as $4^{th}$-Generation (4G) Long-Term Evolution (LTE) and $5^{th}$-Generation (5G) New Radio (NR) radio access technologies, and particularly in environments in which an LTE base station can be used to anchor 5G Non-Standalone Architecture (NSA) connections in conjunction with an associated NR Standalone base station.

As existing wireless networks are upgraded to 5G, the networks may retain their older radio access networks such as 4G LTE radio access networks. As a result, in some situations a 5G NR base station may be associated with a 4G LTE base station, and the two base stations may be configured to implement NSA dual connectivity. When using NSA dual connectivity, data communications with a cellular communication device use both an LTE bearer and an NR bearer, with the LTE base station serving as anchor.

In this environment, a cellular communication device, referred to herein as a User Equipment (UE), might initially attach to the base station that uses the latest generation radio access technology, which in this scenario would be the NR base station. When attached to the NR base station, the UE uses NR Standalone connectivity. In some cases, after the UE initially attaches to the NR base station, the NR base station might determine that better performance could be achieved by using NSA dual connectivity. Upon making this determination, the NR base station might redirect the UE to the LTE base station, so that the UE can use NSA dual connectivity with the LTE and NR base stations.

The procedure described above, however, adds a step to the setup process and can reduce call setup reliability. The redirection of the UE from the NR base station to the LTE base station also consumes resources that might otherwise be conserved if the UE were to initially attach to the LTE base station without having to be redirected there by the NR base station.

In certain embodiments described herein, an NSA-capable NR base station is configured to broadcast service information to designate one or more service qualities that can be expected of an LTE-anchored NSA connection that utilizes the NR base station. The NR base station also specifies one or more service qualities that can be expected of a NR Standalone connection using the NR base station. Service qualities may comprise network latency, as an example. Other examples of service qualities comprise network latency, whether higher-order modulations are available, the number of layers supported by 4×4 MIMO, and jitter. Some service qualities, such as bearer bandwidth may be explicitly specified by broadcast service information, while other service qualities such as network latency may be deduced based on radio access network (RAN) metrics such as frequency, sub-carrier spacing, and so forth.

If the best service quality can be provided by using an NSA connection rather than a NR Standalone connection, the UE attaches to the LTE base station so that the UE can use NSA connectivity when in connected mode. If the best service quality can be provided using a NR Standalone connection, the UE attaches to the NR base station.

In some embodiments, the NR base station may designate multiple types of service qualities associated for each of the LTE base station and the NR Standalone base station. In these embodiments, the UE may be configured to prioritize the different service quality types based on the service qualities that are important to the device. For example, some types of devices may prioritize bandwidth and jitter while other types of devices may prioritize latency.

In some embodiments, each device or type of device may be preconfigured to prioritize a certain type of service quality. In some cases, a device preconfiguration may specify relative priorities among multiple service qualities. In other cases, a UE might determine priorities dynamically, based on current or predicted needs of the UE. For example, prioritization may be based on the types of applications that have been or are predicted to be executed by the UE, or on the types of services that have been or are predicted to be executed by the UE. For example, suppose that service qualities include both bearer bandwidth and network latency. If previous usage of the UE indicates that the UE is typically used for communications that need relatively high bandwidths, the selection between NSA and NR Standalone may be based on comparative bandwidths. If previous usage of the UE indicates that the UE is typically used for communications that need relatively low network latencies, the selection may be based on latency.

In some cases, different types of service qualities may be weighted, to designate relative priorities, based on device pre-configuration, on previous usage of the UE, and/or on predicted usage of the UE. In these cases, the UE might compare weighted sums of the service qualities when selecting between NSA and NR Standalone. In some cases, machine learning may be used to predict future needs for different types of service qualities, and the selection may be made based on the predicted future needs.

A similar procedure can be performed by the UE during cell reselection, in situations where the UE is in idle mode after already attaching to an LTE base station. When the UE identifies a target cell for reselection, the UE performs additional steps before attaching to the target LTE base station. In particular, the UE refers to data broadcast by the target LTE base station, referred to herein as service information, indicating a service quality that can be expected from LTE base station using NSA in conjunction with an associated NR base station and a service quality that can be expected from the NR base station using NR Standalone connectivity. If better service quality can be obtained using a NR Standalone connection, the UE attaches to the NR base station rather than to the target LTE base station. Otherwise, the UE attaches to the target LTE base station, thereby allowing the use of NSA connectivity by the UE.

In cases where the UE is in idle mode and camped on an NR base station, the NR base station may at times determine that under current conditions, an NSA connection would be preferable to a NR Standalone connection implemented by the NR base station. For example, the NR base station may determine that an NSA connection would provide better service quality than the NR Standalone connection. Upon making this determination, the NR base station might redirect the UE to an LTE base station associated with the NR base station, so that the UE can initiate an LTE-anchored NSA connection in conjunction with the NR base station.

The techniques described herein allow a communication device to determine, prior to initial attachment and/or prior to cell reselection, which of multiple available connection options is likely to result in the best service quality and user experience. The communication device can then attach to either the LTE base station or the NR base station in order to implement the desired connection option. If NSA dual connectivity would provide the highest service quality, for example, the communication device attaches to the LTE base station so that the UE can use an LTE-anchored NSA connection. If a NR Standalone connection would instead provide the highest service quality, the communication device attaches to the NR base station. This avoids the inefficiencies and waste of resources that might otherwise be incurred by having to be redirected to a different base station by the NR base station.

Note that although various techniques are described herein as using LTE/NR dual connectivity with an LTE anchor, the techniques may be applied more generally to situations in which an NR base station is used as an anchor for dual connectivity, as well as to situations in which two base stations of the same radio access technology are used for dual connectivity.

Figure 1:
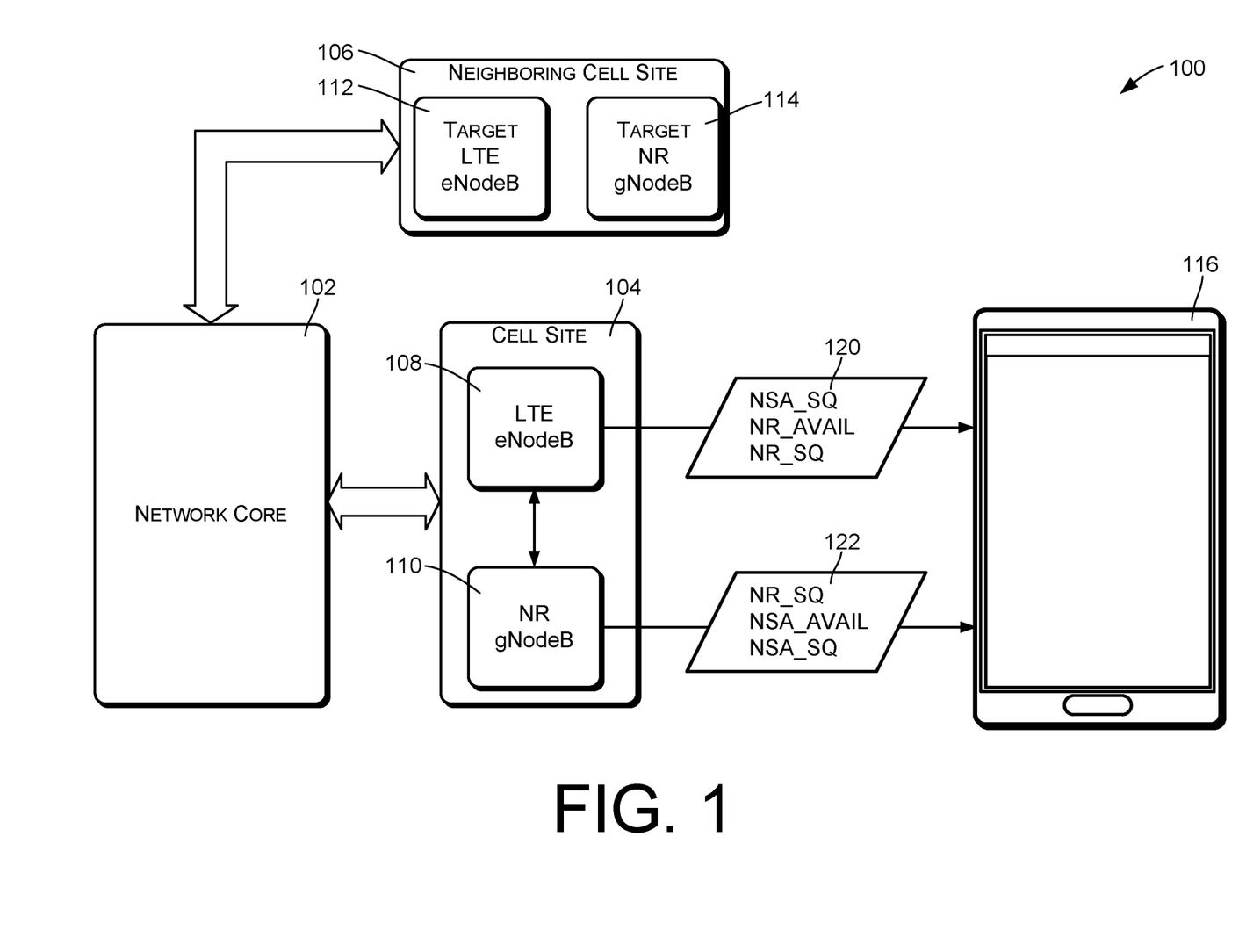
FIG. 1 is a block diagram showing relevant components of a communication network that supports Non-Standalone Architecture (NSA) dual connectivity based on $4^{th}$-Generation (4G) and $5^{th}$-Generation (5G) radio access technologies.

FIG. 1 illustrates relevant high-level components of a cellular communication system 100 that may be used to implement the techniques described herein. The system 100 has one or more network cores 102, which may in some cases include a 4G network core and/or a 5G network core. The system 100 also has a cell site 104, which is shown as an example of many such cell sites that may exist within the communications system 100. FIG. 1 also shows a second cell site 106, which is an example of a cell site that neighbors the cell site 104. The second cell site 106 will be referred to herein as the neighboring cell site 106.

The cell site 104 supports both 4G and 5G radio access technologies, and therefore has both 4G and 5G cellular access points. The 4G access point is implemented as an LTE base station 108, also referred to as an eNodeB. The 5G access point is implemented as a New Radio (NR) base station 110, also referred to as a gNodeB. The network core(s) 102 communicate with the LTE base station 108 and the NR base station 110. Note that although the LTE base station 108 and the NR base station 110 are shown as being collocated at a single cell site, in other implementations the described techniques may be performed using LTE and NR base stations that are not collocated.

The neighboring cell site 106 also has an LTE base station 108 and an NR base station 110. These base stations will be discussed below in relation to cell reselection, and will be referred to as the target LTE base station 112 and the target NR base station 114.

FIG. 1 shows a cellular communication device 116, referred to herein as a User Equipment (UE) 116, as an example of many such devices that are configured for use with the communication system 100. In the described embodiment, the UE 116 supports both 4G/LTE and 5G/NR networks and communications. Accordingly, the UE 116 has an LTE radio (not shown) that communicates wirelessly with the LTE base station 108 of the cell site 104 and an NR radio (not shown) that communicates wirelessly with the NR base station 110 of the cell site 104. The radios may also be used to communicate with base stations of other cell sites, including those of the neighboring cell site 106.

The UE 116 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc.

The UE 116 may communicate through either or both of the LTE base station 108 and the NR base station 110. In some cases or embodiments, the UE 116 may support dual connectivity, in which a single communication session simultaneously uses both a 4G connection and a 5G connection. More specifically, the UE 116 may operate using what is referred to as a Non-Standalone Architecture (NSA) dual connectivity, using 5G radio access technology to augment 4G communications. When using NSA dual connectivity, the UE 116 uses both an LTE bearer and an NR bearer for data communications.

Figure 2:
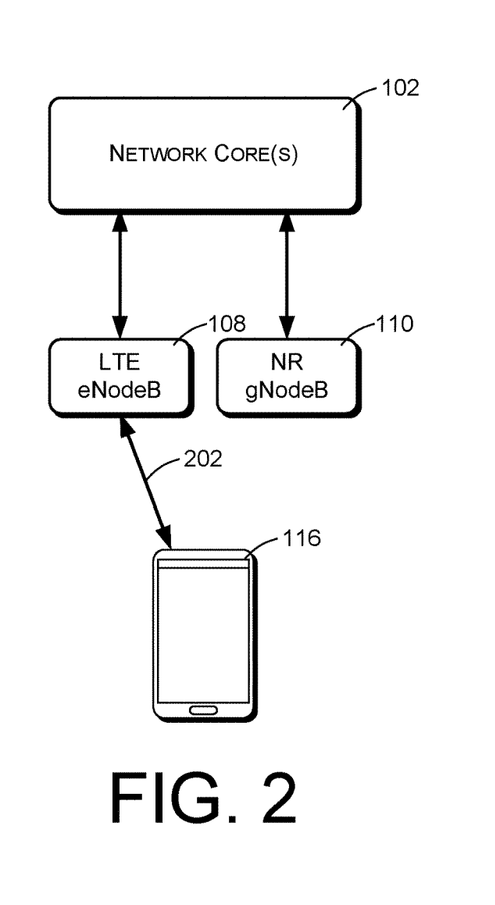
FIGS. 2-4 are block diagrams illustrating different methods of utilizing associated Long-Term Evolution (LTE) and New Radio (NR) base stations.
Figure 3:
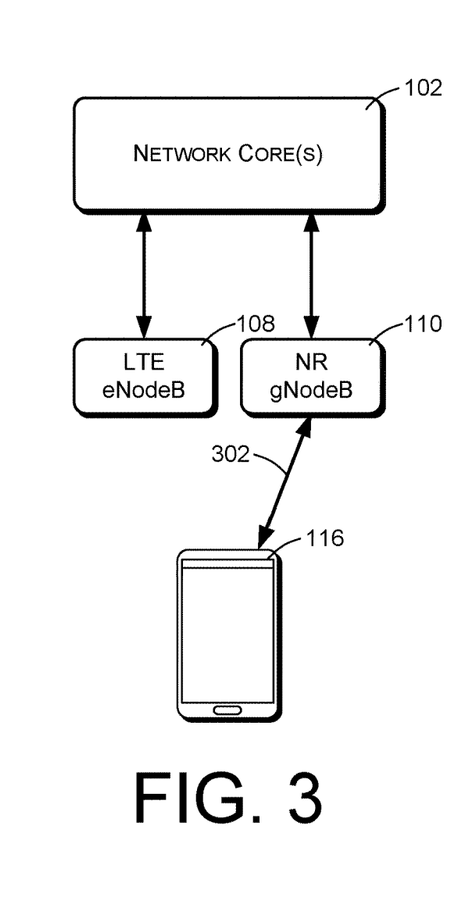
Figure 4:
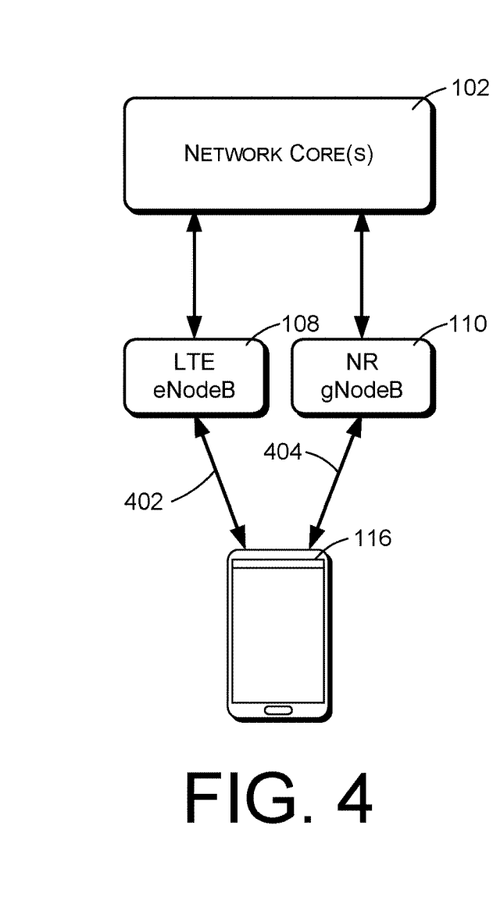

FIGS. 2-4 illustrate different types of connections that can be made by the UE 116 through the base stations of the cell site 104. FIG. 2 shows a standalone LTE connection, where the UE 116 uses an LTE bearer 202 to communicate through the LTE base station 108. FIG. 3 shows a NR Standalone connection, where the UE 116 uses an NR bearer 302 to communicate through the NR base station 110. FIG. 4 illustrates a non-standalone architecture (NSA) connection, where the UE 116 uses both an LTE bearer 402 and an NR bearer 404 for communications. In the NSA configuration of FIG. 4, the LTE base station 108 acts as the primary base station to anchor a session, and the NR base station 110 acts as a secondary base station to supplement user-plane communications.

Note that in the NSA configuration of FIG. 4, there is not always an active bearer between the UE 116 and the NR base station 110, even when the LTE base station 108 supports NSA dual connectivity. For example, there is not an active NR connection when the UE 116 is in idle mode. When the UE 116 is attached to the LTE base station 108 and is in connected mode, an NR bearer is added for NSA communications.

During initialization, such as at power-on, the UE 116 performs an initial attachment to either the LTE base station 108 or the NR base station 110. When the LTE base station 108 supports NSA dual connectivity, initially attaching to the LTE base station 108 enables the use of NSA communications during active data sessions. For example, a connection may use an LTE bearer for primary communications and may add or remove an NR bearer depending on conditions and demands. Initially attaching to the NR base station 110, on the other hand, results in NR Standalone communications.

Referring again to FIG. 1, the LTE base station 108 and the NR base station 110 broadcast signals from which the UE 116 can obtain information for attaching to the LTE and NR base stations. In accordance with certain embodiments described herein, information broadcast by the LTE base station 108 specifies LTE service information 120 regarding service qualities that can be provided by using LTE-anchored NSA dual connectivity and by using NR Standalone connectivity, where the LTE-anchored NSA dual connectivity uses both the LTE base station 108 and the NR base station 110, and the NR Standalone connectivity uses the NR base station 110. Information broadcast by the NR base station 110 similarly specifies NR service information 122 regarding service qualities that can be provided by using LTE-anchored NSA dual connectivity and by using NR Standalone connectivity.

More specifically, the LTE service information 120 and the NR service information 122 each specify a service quality NSA_SQ for the LTE base station 108 and a service quality NR_SQ for the NR base station 110. In addition, the LTE service information 120 specifies a NR availability indicator NR_AVAIL, specifying that there is an NR base station collocated with or otherwise associated with the LTE base station. The NR service information 122 specifies an NSA availability indicator NSA_AVAIL, specifying that the NR base station 110 is collocated with or otherwise associated with an LTE base station to support NSA connectivity.

In some cases, the service qualities NSA_SQ and NR_SQ may comprise bandwidths. In these cases, NSA_SQ may correspond to an aggregate NSA bandwidth that can be provided by using simultaneous LTE and NR bearers. The service qualities NSA_SQ and NR_SQ may also represent other bearer characteristics, such network latency, for example.

In some embodiments, NSA_SQ and NR_SQ may each comprise a network latency that can be expected of bearers provided by the LTE base station 108 and NR base station 110, respectively. In some embodiments, the base stations may broadcast multiple parameters corresponding respectively to different types of service qualities, such as bandwidth, latency, jitter, the number of 4×4 MIMO layers supported, higher-order modulations supported, and so forth.

In certain embodiments described herein, the LTE service information 120 and the NR service information 122 may be included in Synchronization Signal Blocks (SSBs) and/or System Information Blocks (SIBs) that are repeatedly transmitted by the LTE base station 108 and the NR base station 110.

Before initially attaching to a base station, the UE 116 searches for an NR signal from the NR base station 110 to obtain the NR service information 122. If the UE 116 detects a signal from the NR base station 110 and determines from the NSA availability variable NSA_AVAIL that the NR base station 110 is associated with an LTE base station that supports NSA, the UE 116 compares NSA service qualities of the LTE base station 108 and standalone service qualities of the NR base station 110, as indicated by the parameters obtained from the LTE service information 120 and the NR service information 122, to determine whether to initially attach to the LTE base station 108 or to the NR base station 110. Generally, the UE will attach to the NR base station if a NR Standalone connection will result in a higher service quality and to the LTE base station if an NSA connection will result in a higher service quality.

In some situations, the LTE and NR base stations may report multiple service qualities. In these situations, selecting between the base stations may involve prioritizing the service qualities before comparing them. As one example, bandwidth may be prioritized over latency, and the selection may therefore be made based on bandwidth alone. In some cases, the selection may be made by calculating a weighted sum of service qualities of each base station and comparing the weighted sums. Prioritizing and/or weighting may be based on UE preconfiguration, on previous or predicted usage of the UE such as on the types of services that have been or are predicted to be requested or used by the UE, the applications that have been or are predicted to be used by the UE, and the types of service qualities that are important to those services and applications.

At times, the UE 116 may be in idle mode and camped on the LTE base station 108. While the UE 116 is in idle mode, the UE 116 may elect to perform cell reselection and to switch its LTE connection from the current LTE base station 108 to what is shown in FIG. 1 as the target LTE base station 112. Before attaching to the target LTE base station 112, however, the UE 116 references the LTE service information 120 to determine whether it would be better to attach to the target LTE base station 112 or the associated target NR base station 114. Again, if an NSA connection would provide better service quality, the UE 116 attaches to the target LTE base station 112. If a NR Standalone connection would provide better service quality, the UE 116 attaches to the target NR base station 114.

Although reselection is described herein as switching to a different base station, reselection may more generally comprise switching to a different cell, which may at times be supported by the same base station as the current serving base station. In this case, the serving base station would also be considered to be the target base station.

When in idle mode and camped on the NR base station 110, the NR base station 110 may in some cases determine that an LTE/NR NSA connection would provide better service quality than the NR Standalone connection supported by the NR base station 110. If this is the case, the NR base station 110 may redirect the UE 116 to the associated LTE base station 108 for potential implementation of NSA dual connectivity.

Figure 5:
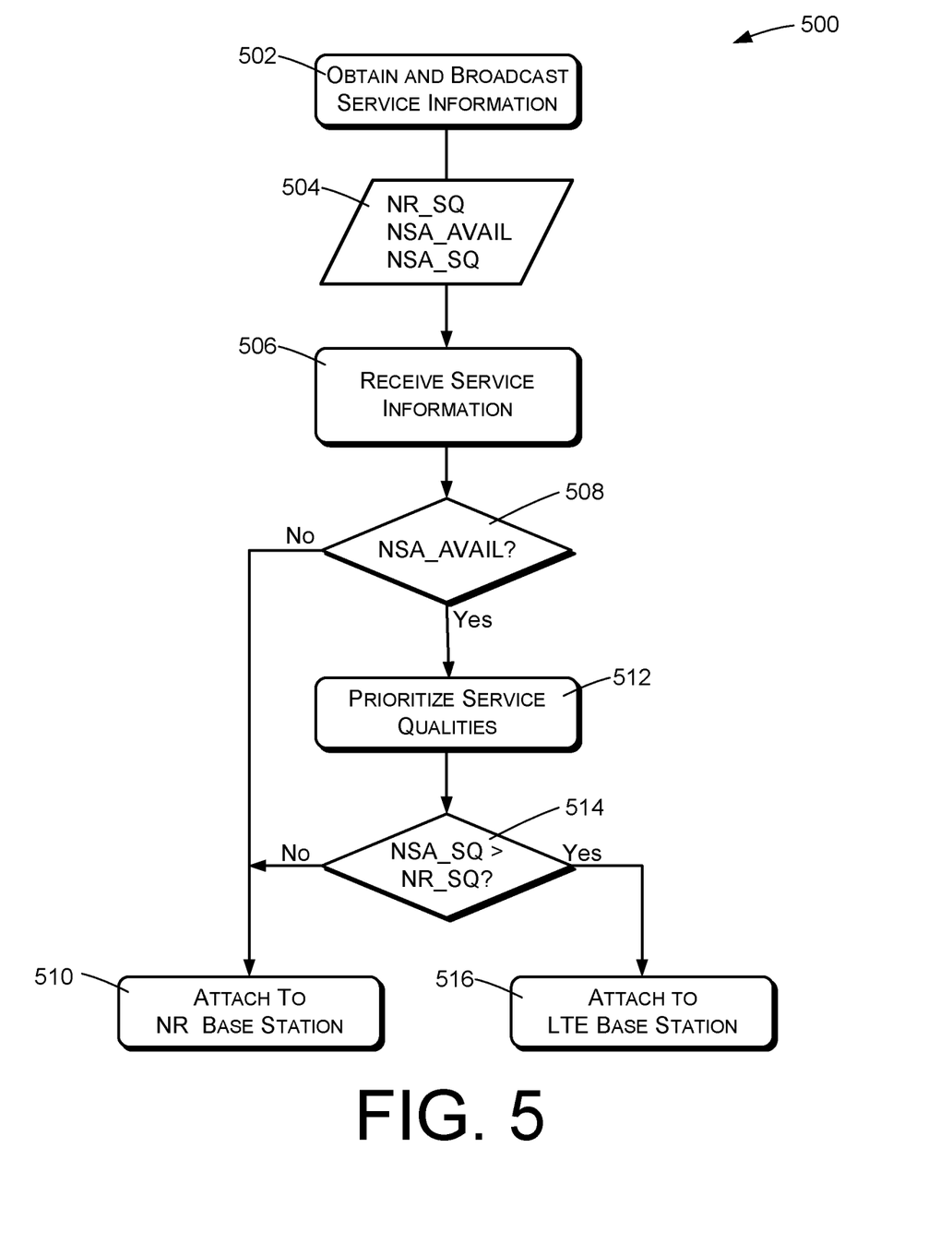
FIG. 5 is a flow diagram illustrating an example method that may be performed by a cellular communication device to select either an LTE base station or an NR base station for initial attachment.

FIG. 5 shows an example method 500 that may be implemented by an NR base station and a UE to select one of multiple available base stations for initial attachment. The example method 500 assumes that the UE is in an environment similar to that shown in FIG. 1 and can select between attaching to an NR base station or to an LTE base station, and where the NR and LTE base stations are collocated or otherwise associated to support LTE-anchored NSA dual connectivity.

If the UE attaches to the LTE base station, NSA dual connectivity may be used when the UE is in connected mode. Specifically, when in connected mode an NR bearer may at times be added to supplement the LTE anchor bearer. If the UE attaches to the NR base station, NR Standalone connectivity will be used when in connected mode, unless at some point the NR base station redirects the UE to the LTE base station.

An action 502 is performed by the NR base station. The action 502 comprises obtaining service information 504 and broadcasting it so that it can be received and used by UEs when attaching to the NR base station. Among other information, the broadcast service information 504 specifies service qualities, such as bandwidths, that can be provided by the LTE and NR base stations, respectively. The broadcast service information 504 may also indicate whether the NR base station is associated with an LTE base station to support NSA dual connectivity.

More specifically, the service information 504 may include a flag or other variable, referred to herein as NSA_AVAIL, indicating that the NR base station is associated with the LTE base station to support LTE-anchored NSA dual connectivity. NSA_AVAIL may be referred to at times herein as an NSA availability variable or flag. NSA_AVAIL may in some cases be specified in a System Information Block (SIB) broadcast by the NR base station, where a positive value indicates that the NR base station is associated with an LTE base station to support NSA dual connectivity. In some embodiments, the absence of the NSA availability variable may indicate that the NR base station is not associated with an LTE base station for NSA dual connectivity.

The NR service information 504 may also specify a parameter NR_SQ designating an NR service quality that is currently available to the UE for NR Standalone connectivity with the NR base station. For example, NR_SQ may comprise the bandwidth that can currently be provided by the NR base station using NR Standalone connectivity. The downlink channel bandwidth is shared by the NR base station through the Master Information Block (MIB). The broadcast information 504 may include various other data from which various additional service qualities can be determined. For example, network latency may be deduced based on RAN metrics such as frequency, sub-carrier spacing, and so forth.

The NR service information 504 may also specify a service quality NSA_SQ that is currently available to the UE for NSA connectivity using the LTE base station 108 and the NR base station 110. In some cases, NSA_SQ may represent the aggregate bandwidth that can be provided by the LTE and NR base stations to support NSA dual connectivity. Note that in some cases, the parameter NSA_SQ may instead comprise an LTE service quality LTE_SQ, such as an LTE bandwidth, from which the NR base station can determine NSA_SQ.

In some cases, the NR base station may be preconfigured with the service information 504, particularly NSA_SQ and NSA_AVAIL, based on known characteristics of NSA connectivity provided by a particular pair of NR and LTE base stations. In some cases, the NR base station may query the LTE base station to obtain NSA_SQ.

An action 506, as well as subsequent actions of FIG. 5, are performed by the UE prior to initially attaching to one of the LTE and NR base stations. The action 506 and subsequent actions of FIG. 5 may be performed, for example, when the UE is turned on and scans NR frequency bands to find a suitable NR signal.

The action 506 comprises receiving the service information 504 broadcast by the NR base station to obtain the parameters NR_SQ, NSA_AVAIL, and NSA_SQ as described above.

An action 508 comprises determining whether the NSA availability variable NSA_AVAIL is present in the broadcast service information 504 and, if so, whether it indicates that the NR base station is associated with an LTE base station for support of NSA dual connectivity. If the NR base station is not associated with an LTE base station in this way, an action 510 is performed, comprising attaching to the NR base station. More generally, the action 510 may comprise initiating a search for an LTE base station.

An action 512, as well as subsequent actions, may be performed by the UE if the NSA_AVAIL is present in the SIB 504 and indicates that the NR base station is associated with an LTE base station for support of NSA dual connectivity.

The action 512 is performed if the service information 504 includes parameters that are for multiple types of service qualities or that allow a UE to determine multiple types of service qualities. The action 512 comprises prioritizing the types of service qualities that will be considered when subsequently determining which of the LTE and NR base stations should be selected for initial attachment. Prioritizing the service qualities may be based, for example, on configuration settings of the UE. For example, certain types of UEs may prioritize certain types of service parameters. In other cases, a UE may prioritize service quality types based on the types of activities typically performed by the UE or that are expected to be performed by the UE. In some embodiments, machine learning may be used to analyze historical usage of the UE to determine whether to prioritize bandwidth over latency, or to prioritize latency over bandwidth, as an example. More specifically, past usage may be analyzed to determine the types of applications that are typically used on the UE and the types of service qualities that are important to those applications, and to prioritize service qualities.

In some embodiments, the action 512 may include assigning weights to different types of service qualities to establish their relative importance based on configuration data and/or past usage of the UE.

An action 514 comprises selecting one of the LTE and NR base stations based on which of the base stations can provide the highest or best service quality, based at least in part on the service quality information obtained from the service information 504. Specifically, the selection of one of the base stations may be based on comparing the NSA service quality parameter NSA_SQ and the NR service quality parameter NR_SQ to determine which is greatest. Where NSA_SQ and NR_SQ correspond to bandwidth, for example, the action 514 may comprise comparing the bandwidths that can be provided by an LTE-anchored NSA connection and a NR Standalone connection. If the NSA connection would be faster, the LTE base station is selected. If the NR connection would be faster, the NR base station is selected.

If NSA_SQ and NR_SQ correspond to network latency, as another example, the action 514 may comprise comparing the latencies that can be provided by an LTE-anchored NSA connection and a NR Standalone connection. If the NSA connection would be provider lower latencies, the LTE base station is selected. If the NR connection would provide lower latencies, the NR base station is selected. It is assumed here that NSA_SQ, and NR_SQ increase to indicate improved service qualities such as increased bandwidths and decreased latencies.

In cases where the service information 504 designates multiple types of service qualities the action 514 may comprise comparing a prioritized one of the multiple types of service qualities. In other cases or embodiments, the action 514 may comprise comparing service qualities of multiple types, such as bandwidth and network latency, based on priorities or weights determined in the action 512, and selecting the base station accordingly. If an NSA connection can provide the highest weighted combination of service qualities, the LTE base station is selected. If a NR Standalone connection can provide the highest weighted combination of service qualities, the LTE base station is selected.

If the action 514 results in selection of the NR base station, the action 510 is performed. The action 510 comprises performing an initial attach procedure with the NR base station. After attaching to the NR base station, the NR base station may subsequently be used for NR Standalone connectivity when the UE is in connected mode.

If the action 512 results in selection of the LTE base station, an action 516 is performed. The action 516 comprises performing an initial attach procedure with the LTE base station. After attaching to the LTE base station, the LTE base station and the NR base station may subsequently be used together for NSA dual connectivity.

Figure 6:
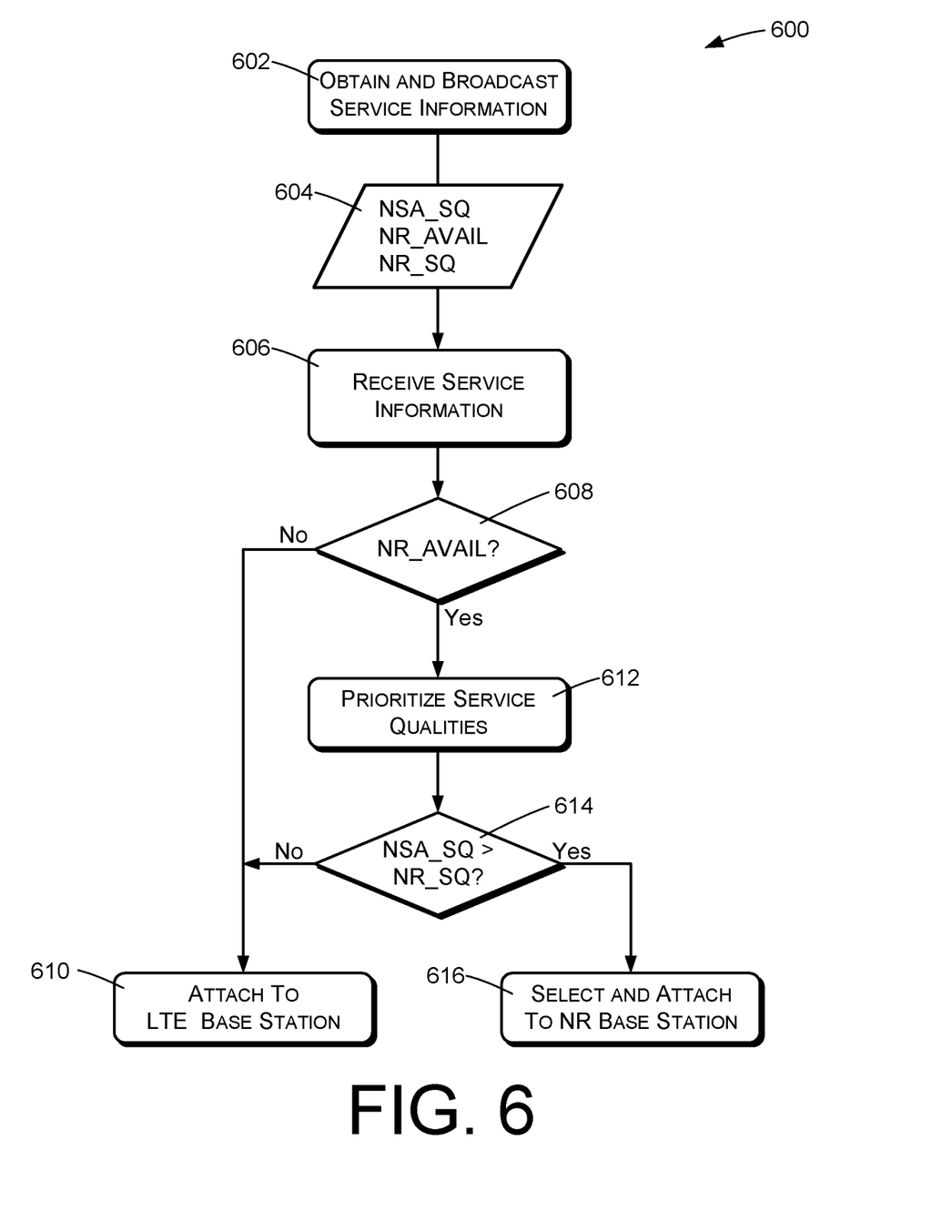
FIG. 6 is a flow diagram illustrating an example method that may be performed by a cellular communication device to select either an LTE base station or an NR base station for cell reselection.

FIG. 6 shows an example method 600 that may be implemented by an LTE base station and a UE to select one of multiple available base stations for cell reselection, in situations where the UE is camped on a cell of a serving LTE base station. In particular, the method 600 allows a UE to determine whether to switch to an LTE base station or NR base station of a target cell, particularly where the LTE and NR base stations are associated with each other to support NSA dual connectivity. For purposes of discussion, the LTE and NR base stations that support the target cell will be referred to as target base stations. Note that in some cases, the target LTE base station may be the same as the current serving LTE base station.

An action 602 is performed by the LTE base station. The action 602 comprises obtaining service information 604 and broadcasting it so that it can be received and used by UEs when attaching to the LTE base station. Among other information, the broadcast service information 604 specifies service qualities, such as bandwidth, that can be provided by the LTE and NR base stations, respectively. The broadcast service information 604 may also indicate whether the LTE base station is associated with an NR base station to support NSA dual connectivity. The broadcast information 604 may include various other data from which various additional service qualities can be determined. For example, network latency may be deduced based on RAN metrics such as frequency, sub-carrier spacing, and so forth.

More specifically, the service information 604 may include a flag or other variable, referred to herein as NR_AVAIL, indicating that the NR base station is associated with the LTE base station. NR_AVAIL may be referred to at times herein as an NR availability variable or flag. NR_AVAIL may in some cases be specified in a System Information Block (SIB) broadcast by the LTE base station, where a positive value indicates that the LTE base station is associated with an NR base station for support of NSA dual connectivity. In some embodiments, the absence of the NR availability variable may indicate that the LTE base station is not associated with an NR base station.

The LTE service information 604 may also specify the parameter NR_SQ, which as described above designates the NR service quality that is currently available to the UE for NR Standalone connectivity with the NR base station. The LTE service information 604 may also specify a service quality NSA_SQ that is currently available to the UE for NSA connectivity using the LTE base station 108 and the NR base station 110. In some cases, NSA_SQ may represent the aggregate bandwidth that can be provided by the LTE and NR base stations when implementing NSA dual connectivity. The downlink channel bandwidth is shared by the LTE base station through the Master Information Block (MIB).

In some cases, the LTE base station may be preconfigured with the service information 604, particularly NR_SQ and NR_AVAIL, based in part on known characteristics of NSA connectivity provided by a particular pair of NR and LTE base stations. In some cases, the LTE base station may query the NR base station to obtain NR_SQ.

An action 606, as well as subsequent actions of FIG. 6, are performed by the UE prior to switching to one of the target LTE and target NR base stations for cell reselection. The action 606 comprises receiving the service information 604, to obtain the parameters NSA_SQ, NR_AVAIL, and NR_SQ.

An action 608 comprises determining whether the NR availability variable NR_AVAIL is present in the broadcast service information 604 and, if so, whether it indicates that the target LTE base station is associated with an NR base station for support of NSA dual connectivity. If the LTE base station is not associated with an NR base station to support NSA, an action 610 is performed, comprising attaching to the target LTE base station.

An action 612, as well as subsequent actions, may be performed by the UE if NR_AVAIL is present in the SIB 604 and indicates that the LTE base station is associated with an NR base station to support NSA dual connectivity.

The action 612 may be performed if the service information 604 includes parameters that are for multiple types of service qualities or that allow a UE to determine multiple types of service qualities. The action 612 comprises prioritizing the types of service qualities that will be considered when subsequently determining which of the LTE and NR base stations should be selected for reselection. Prioritizing the service qualities may be based, for example, on configuration settings of the UE. For example, certain types of UEs may prioritize certain types of service parameters. In other cases, a UE may prioritize service quality types based on the types of activities typically performed by the UE or that are expected to be performed by the UE. In some embodiments, machine learning may be used to analyze historical usage of the UE to determine whether to prioritize bandwidth over latency, or to prioritize latency over bandwidth, as an example. More specifically, past usage may be analyzed to determine the types of applications that are typically used on the UE and the types of service qualities that are important to those applications, and to prioritize service qualities.

In some embodiments, the action 612 may include assigning weights to different types of service qualities to establish their relative importance based on configuration data and/or past usage of the UE.

An action 614 comprises selecting one of the target LTE and NR base stations based on which of the base stations can provide the highest or best service quality, based at least in part on the service quality information obtained from the SI broadcast by the NR base station. Specifically, the selection of one of the base stations may be based on comparing the NSA service quality parameter NSA_SQ and the NR service quality parameter NR_SQ to determine which is greatest. Where NSA_SQ and NR_SQ correspond to bandwidth, for example, the action 614 may comprise comparing the bandwidths that can be provided by an LTE-anchored NSA connection and a NR Standalone connection. If the NSA connection would be faster, the LTE base station is selected. If the NR connection would be faster, the NR base station is selected.

If NSA_SQ and NR_SQ correspond to network latency, as another example, the action 614 may comprise comparing the latencies that can be provided by an LTE-anchored NSA connection and a NR Standalone connection. If the NSA connection would provide lower latencies, the LTE base station is selected. If the NR connection would provide lower latencies, the NR base station is selected. It is assumed here that NSA_SQ, and NR_SQ increase to indicate improved service qualities such as increased bandwidths and decreased latencies.

In cases where the system information 604 designates multiple service qualities for each UE the action 614 may comprise comparing a prioritized one of multiple types of service qualities. In other cases or embodiments, the action 614 may comprise comparing service qualities of multiple types, such as bandwidth and network latency, based on the priorities or weights determined in the action 612, and selecting the base station accordingly. If an NSA connection can provide the highest weighted combination of service qualities, the LTE base station is selected. If a NR Standalone connection can provide the highest weighted combination of service qualities, the LTE base station is selected.

If the action 614 results in selection of the LTE base station, the action 610 is performed. The action 610 comprises attaching to the LTE base station. If the action 612 results in selection of the NR base station, an action 616 is performed. The action 616 comprises attaching to the NR base station.

Figure 7:
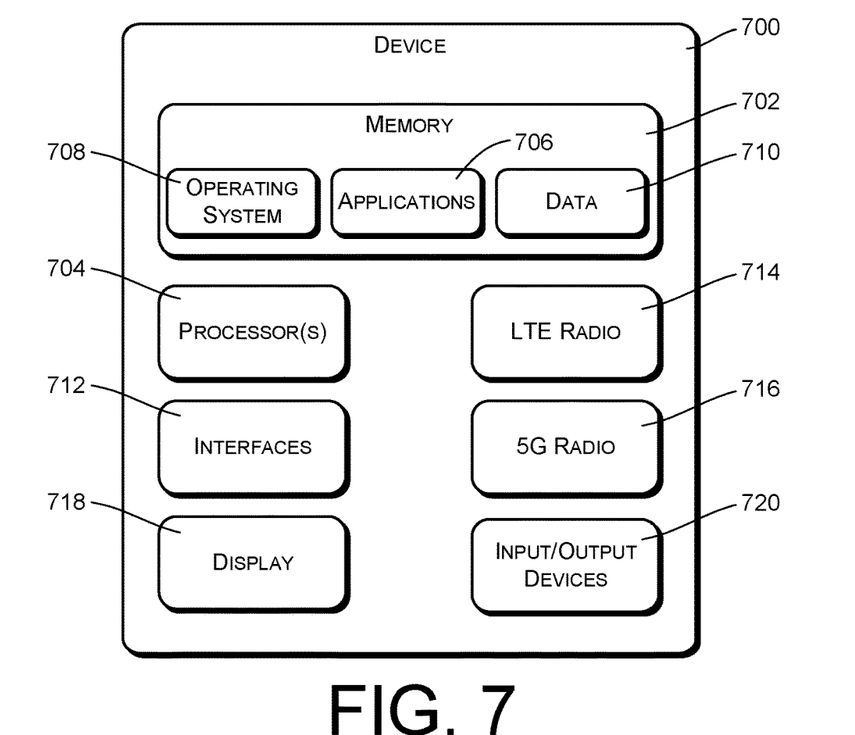
FIG. 7 is a block diagram of an example mobile communication device that may be configured in accordance with the described techniques.

FIG. 7 illustrates an example cellular communication device 700 that may be used to implement the techniques described herein. The methods of FIGS. 2-6, for example, may be implemented by a device such as the device 700. The device 700 is an example of the UE 116, illustrating additional high-level components that are not shown in FIG. 1.

The device 700 may include memory 702 and a processor 704. The memory 702 may include both volatile memory and non-volatile memory. The memory 702 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 702 may include a SIM (subscriber identity module), which is a removable smart card used to identify a user of the device 700 to a service provider network.

The memory 702 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 702 may in some cases include storage media used to transfer or distribute instructions, applications, and/or data. In some cases, the memory 702 may include data storage that is accessed remotely, such as network-attached storage that the device 700 accesses over some type of data communication network.

The memory 702 stores one or more sets of computer-executable instructions (e.g., software) such as programs that embody operating logic for implementing and/or performing desired functionality of the device 700. The instructions may also reside at least partially within the processor 904 during execution thereof by the device 700. Generally, the instructions stored in the computer-readable storage media may include various applications 706 that are executed by the processor 704, an operating system (OS) 708 that is also executed by the processor 704, and data 710.

In some embodiments, the processor(s) 704 is a central processing unit (CPU), a graphics processing unit (GPU), both CPU and GPU, or other processing unit or component known in the art. Furthermore, the processor(s) 704 may include any number of processors and/or processing cores. The processor(s) 704 is configured to retrieve and execute instructions from the memory 702.

The device 700 may have interfaces 712, which may comprise any sort of interfaces known in the art. The interfaces 712 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 700 may also have an LTE radio 714 and a 5G radio 716, which may be used as described above for implementing dual connectivity in conjunction with an eNodeB and a gNodeB. The radios 714 and 716 transmit and receive radio frequency communications via an antenna (not shown).

The device 700 may have a display 718, which may comprise a liquid crystal display or any other type of display commonly used in telemobile devices or other portable devices. For example, the display 718 may be a touch-sensitive display screen, which may also act as an input device or keypad, such as for providing a soft-key keyboard, navigation buttons, or the like.

The device 700 may have input and output devices 720. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 8:
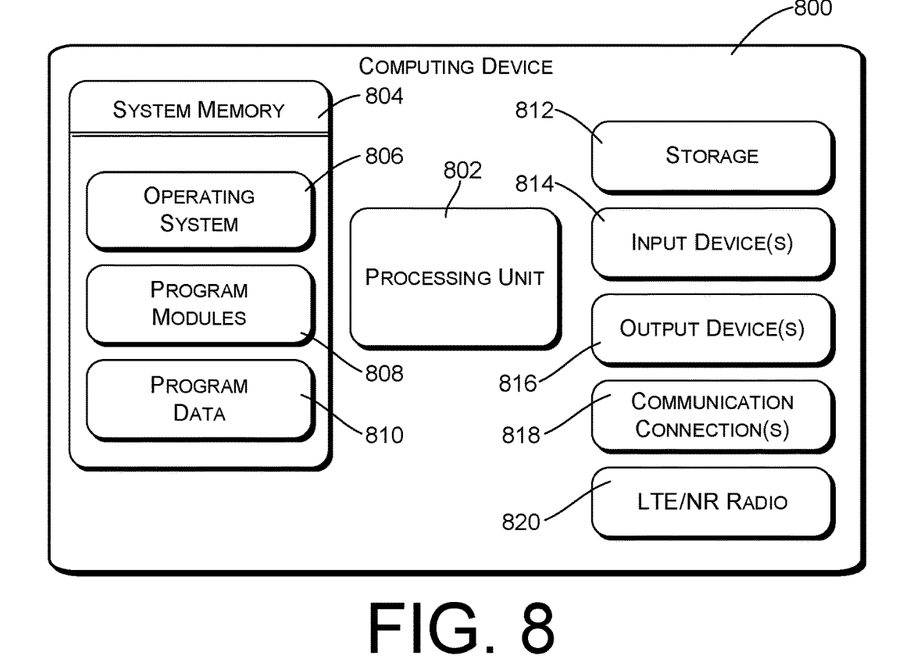
FIG. 8 is a block diagram of an example computing device that may be used to implement various functionality described herein, such as a cellular base station.

FIG. 8 is a block diagram of an illustrative computing device 800 such as may be used to implement a base station for a cellular communication network. One or more computing devices 800 may be used to implement each of the base stations 108, 110, 112, and 114, for example.

In various embodiments, the computing device 800 may include at least one processing unit 802 and system memory 804. Depending on the exact configuration and type of computing device, the system memory 804 may be volatile (such as RAM), non-volatile (such as ROM, flash memory, etc.) or some combination of the two. The system memory 804 may include an operating system 806, one or more program modules 808, and may include program data 810.

The computing device 800 may also include additional data storage devices (removable and/or non-removable) such as, for example, magnetic disks, optical disks, or tape. Such additional storage devices are illustrated in FIG. 8 as storage 812.

Non-transitory computer storage media of the computing device 800 may include volatile and nonvolatile, removable and non-removable media implemented in any method or technology for storage of information, such as computer readable instructions, data structures, program modules, or other data. The system memory 804 and storage 812 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 800. Any such non-transitory computer-readable storage media may be part of the computing device 800.

In various embodiment, any or all of the system memory 804 and storage 812 may store programming instructions which, when executed, implement some or all of the function functionality described above as being implemented by the base stations 108, 110, 112, and 114.

The computing device 800 may also have input device(s) 814 such as a keyboard, a mouse, a touch-sensitive display, voice input device, etc. Output device(s) 816 such as a display, speakers, a printer, etc. may also be included. The computing device 800 may also contain communication connections 818 that allow the device to communicate with other computing devices.

The computing device 800 may also include a radio 820, which may be an LTE radio or an NR radio. The radio may be used to implement wireless communications using LTE radio access technology, NR radio access technology, or other radio access technologies. In some cases, the radio 820 may be an independent device, apart from the computing device 800, that is accessible to or controlled by the computing device 800.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication device, the method comprising:
   receiving data from a first base station of a cell, the first base station being associated with a second base station of the cell to support non-standalone dual connectivity, wherein the first base station operates using a first radio access technology and the second base station operates using a second radio access technology;
   the data comprising:
   a designation of a first service quality that is available to the cellular communication device for standalone connectivity using the first base station; and
   a designation of a second service quality that is available to the cellular communication device for non-standalone dual connectivity using the first base station and the second base station;
   selecting, as a selected base station, one of the first base station and the second base station, based at least in part on the first service quality and the second service quality; and
   attaching to the selected base station.

2. The method of claim 1, wherein the attaching comprises at least one of:
   performing an initial attach to the selected base station; or
   attaching to the selected base station for cell reselection.

3. The method of claim 1, wherein the second service quality comprises at least one of:
   a bandwidth provided by the second base station; or
   an aggregate bandwidth provided by the first base station and the second base station.

4. The method of claim 1, wherein:
   the first service quality comprises at least one of:
   data from which a first bandwidth can be determined; or
   data from which a first latency can be determined; and
   the second service quality comprises at least one of:
   data from which a second bandwidth can be determined; or
   data from which a second latency can be determined.

5. The method of claim 1, wherein:
   the first radio access technology comprises New Radio (NR) radio access technology; and the second radio access technology comprises Long-Term Evolution (LTE) radio access technology.

6. The method of claim 1, the data further comprising an indication that the first base station and the second base station are associated with each other to support the non-standalone dual connectivity.

7. The method of claim 1, wherein the data comprises system information that has been broadcast by the first base station for reception by multiple devices.

8. The method of claim 1, further comprising:
prioritizing multiple types of service qualities; and
wherein the selecting is based at least in part on the prioritizing.

9. The method of claim 1, further comprising:
prioritizing multiple types of service qualities based at least in part on one or more activities of the cellular communication device; and
wherein the selecting is based at least in part on the prioritizing.

10. A cellular communication device, comprising:
a Long-Term Evolution (LTE) radio;
a 5th-Generation (5G) New Radio (NR) radio;
one or more processors; and
one or more non-transitory computer-readable media storing computer-executable instructions that, when executed by the one or more processors, cause the one or more processors to perform actions comprising:
receiving, by the 5G NR radio, first data from a first NR base station of a cell, wherein the first NR base station is associated with a first LTE base station of the cell to support Non-Standalone Architecture (NSA) dual connectivity;
the first data comprising:
a designation of a first service quality that is available to the cellular communication device for standalone connectivity using the first 5G NR base station; and
a designation of a second service quality that is available to the cellular communication device for NSA dual connectivity using the first LTE base station and the first NR base station;
selecting, as a selected base station, one of the first LTE base station and the first 5G NR base station based at least in part on the first and second service qualities; and
performing an initial network attach to the selected base station.

11. The cellular communication device of claim 10, wherein:
the first service quality comprises at least one of:
data from which a first bandwidth can be determined; or
data from which a first latency can be determined; and
the second service quality comprises at least one of:
data from which a second bandwidth can be determined; or
data from which a second latency can be determined.

12. The cellular communication device of claim 10, the actions further comprising:
identifying a second LTE base station for cell reselection;
receiving second data that has been broadcast by the second LTE base station, the second data comprising:
a designation of a third service quality that is available to the cellular communication device for standalone connectivity using a second NR base station;
a designation of a fourth service quality that is available to the cellular communication device for non-standalone dual connectivity using the second LTE base station and the second NR base station;
selecting, as a reselected base station, one of the second LTE base station and the second NR base station, based at least in part on the third service quality and the fourth service quality; and
attaching to the reselected base station.

13. The cellular communication device of claim 10, the first data further comprising an indication that the first NR base station and the first LTE base station are associated with each other to support 5G NSA dual connectivity.

14. The cellular communication device of claim 10, wherein the second service quality comprises at least one of:
a LTE bandwidth; or
an aggregate NSA bandwidth.

15. The cellular communication device of claim 10, the actions further comprising:
prioritizing multiple types of service qualities; and
wherein the selecting is based at least in part on the prioritizing.

16. A cellular communication device, comprising:
a Long-Term Evolution (LTE) radio;
a 5th-Generation (5G) New Radio (NR) radio;
one or more processors; and
one or more non-transitory computer-readable media storing computer-executable instructions that, when executed by the one or more processors, cause the one or more processors to perform actions comprising:
identifying a target LTE base station of a cell for cell reselection;
receiving data that has been broadcast by the target LTE base station, the data comprising:
a designation of a first service quality that is available to the cellular communication device for standalone connectivity using an NR base station of the cell, the NR base station being associated with the target LTE base station; and
a designation of a second service quality that is available to the cellular communication device for Non-Standalone (NSA) dual connectivity using the target LTE base station and the NR base station;
selecting, as a selected base station, one of the target LTE base station and the NR base station, based at least in part on the first service quality and the second service quality; and
attaching to the selected base station for the cell reselection.

17. The cellular communication device of claim 16, wherein:
the first service quality comprises at least one of:
data from which a first bandwidth can be determined; or
data from which a first latency can be determined; and
the second service quality comprises at least one of:
data from which a second bandwidth can be determined; or
data from which a second latency can be determined.

18. The cellular communication device of claim 16, the data further comprising an indication that the target LTE base station and the NR base station are associated with each other to support NSA dual connectivity.

19. The cellular communication device of claim 16, wherein the second service quality comprises at least one of:
a LTE bandwidth; or
an aggregate NSA bandwidth.

20. The cellular communication device of claim 16, the actions further comprising:
prioritizing multiple types of service qualities; and wherein the selecting is based at least in part on the prioritizing.

\* \* \* \* \*